United States Patent
Arunachalam et al.

(10) Patent No.: US 10,958,523 B1
(45) Date of Patent: Mar. 23, 2021

(54) CONSISTENT DEPLOYMENT OF MONITORING CONFIGURATIONS ON MULTIPLE COMPUTING SYSTEMS

(71) Applicant: Bank of America Corporation, Charlotte, NC (US)

(72) Inventors: Annamalai Arunachalam, Singapore (SG); Ian Christopher Raeburn, Chislehurst (GB); Satpal Singh Dua, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/941,376

(22) Filed: Jul. 28, 2020

(51) Int. Cl.
*H04L 12/24* (2006.01)
*H04L 12/26* (2006.01)
*H04L 29/08* (2006.01)

(52) U.S. Cl.
CPC ...... *H04L 41/0866* (2013.01); *H04L 41/0806* (2013.01); *H04L 43/045* (2013.01); *H04L 67/06* (2013.01)

(58) Field of Classification Search
CPC ............. H04L 41/0866; H04L 41/0806; H04L 43/045; H04L 67/06
See application file for complete search history.

(56) References Cited

U.S. PATENT DOCUMENTS

| | | |
|---|---|---|
| 5,257,381 A | 10/1993 | Cook |
| 5,636,376 A | 6/1997 | Chang |
| 5,949,415 A | 9/1999 | Lin et al. |
| 6,895,285 B2 | 5/2005 | Maity |
| 6,979,303 B2 | 12/2005 | McCreesh et al. |
| 7,246,156 B2 | 7/2007 | Ginter et al. |
| 7,299,455 B2 | 11/2007 | Anderson et al. |
| 7,685,272 B2 | 3/2010 | Bansod et al. |
| 7,734,777 B2 | 6/2010 | Raja et al. |
| 7,873,877 B2 | 1/2011 | Rowles et al. |
| 8,046,443 B2 | 10/2011 | Parker et al. |
| 8,175,862 B1 | 5/2012 | Bourlatchkov et al. |
| 8,572,244 B2 | 10/2013 | Campagnoni |

(Continued)

FOREIGN PATENT DOCUMENTS

| | | |
|---|---|---|
| CN | 200990614 Y | 12/2007 |
| JP | 5021886 B2 | 9/2012 |

(Continued)

*Primary Examiner* — Benjamin M Thieu
(74) *Attorney, Agent, or Firm* — Michael A. Springs

(57) ABSTRACT

A user input is obtained at a central monitoring device to deploy in a destination monitoring server a monitoring configuration stored at a source monitoring server. The source monitoring server is configured to monitor at least one parameter for a first set of computing devices and the destination monitoring server is configured to monitor the at least one parameter for a second set of computing devices. The central monitoring device accesses the source monitoring server using a first service account and exports the monitoring configuration to generate an export file. The central monitoring device then accesses the destination monitoring server using a second service account and transfers the export file to the destination monitoring server. The central monitoring server then deploys the monitoring configuration at the destination monitoring server based on the export file.

20 Claims, 3 Drawing Sheets

(56) References Cited

U.S. PATENT DOCUMENTS

| | | |
|---|---|---|
| 8,819,701 B2 | 8/2014 | Wheeler et al. |
| 8,909,761 B2 | 12/2014 | Reynolds et al. |
| 9,577,892 B2 | 2/2017 | Chaudhary et al. |
| 9,645,835 B2 | 5/2017 | Phillips et al. |
| 10,042,628 B2 | 8/2018 | OlmstedThompson |
| 10,282,225 B2 | 5/2019 | Vincent |
| 10,284,600 B2 | 5/2019 | Beckman et al. |
| 10,462,002 B2 | 10/2019 | Beklich et al. |
| 10,565,007 B2 | 2/2020 | Aggarwal |
| 2002/0147974 A1 | 10/2002 | Wookey |
| 2002/0156877 A1 | 10/2002 | Lu et al. |
| 2004/0078682 A1 | 4/2004 | Huang |
| 2004/0162781 A1 | 8/2004 | Searl et al. |
| 2004/0181794 A1 | 9/2004 | Coleman et al. |
| 2004/0230530 A1 | 11/2004 | Searl et al. |
| 2005/0005200 A1 | 1/2005 | Matena et al. |
| 2005/0289538 A1 | 12/2005 | Black-Ziegelbein et al. |
| 2006/0173856 A1 | 8/2006 | Jackson et al. |
| 2006/0173895 A1 | 8/2006 | Engquist et al. |
| 2007/0168919 A1 | 7/2007 | Henseler et al. |
| 2007/0198664 A1 | 8/2007 | Satkunanathan et al. |
| 2008/0141240 A1 | 6/2008 | Uthe |
| 2008/0281962 A1* | 11/2008 | Kai ............... G06Q 10/06 709/224 |
| 2009/0043890 A1 | 2/2009 | Noonan, III |
| 2010/0284145 A1 | 11/2010 | Eizenman et al. |
| 2012/0102484 A1 | 4/2012 | Hopmann et al. |
| 2015/0040127 A1 | 2/2015 | Dippenaar et al. |
| 2018/0336110 A1 | 11/2018 | Brandwine et al. |
| 2018/0336227 A1* | 11/2018 | Bellizia ............ G06F 21/6218 |
| 2020/0019791 A1* | 1/2020 | Vancraybex ........... H04N 7/181 |

FOREIGN PATENT DOCUMENTS

| | | |
|---|---|---|
| JP | 2015164067 A | 9/2015 |
| WO | 2012000999 A1 | 1/2012 |

* cited by examiner

CONSISTENT DEPLOYMENT OF MONITORING CONFIGURATIONS ON MULTIPLE COMPUTING SYSTEMS

TECHNICAL FIELD

The present disclosure relates generally to monitoring computing systems, and more specifically to deploying a monitoring configuration consistently at multiple computing systems.

BACKGROUND

In large enterprises, monitoring performance of computing systems and applications is a formidable task. For example, a large enterprise typically maintains a distributed enterprise network including multiple clusters of computing nodes spread over a large geographical region which makes the network difficult to monitor. Existing monitoring solutions do not provide an efficient method to deploy uniform monitoring rules across multiple monitoring nodes. Accordingly, the performance of an enterprise network may not currently be monitored in a predictable and consistent manner across the network.

SUMMARY

The system and methods implemented by the system as disclosed in the present disclosure provide technical solutions to the technical problems faced by current technology by, among other things, replicating a monitoring configuration deployed at a source monitoring server and consistently deploying the monitoring configuration at one or more destination monitoring servers. The disclosed system and methods provide several practical applications and technical advantages. A central monitoring device (e.g., a central monitoring server) is provided that is capable of communicating with both the source and destination monitoring servers. A user may use a front-end client device connected with the central monitoring device to specify input parameters including an indication of the source monitoring server, an indication of the destination monitoring server and an indication of the monitoring configuration that is to be replicated from the source monitoring server and deployed at the destination monitoring server. Based on the input parameters provided by the user, a monitoring manager at the central monitoring device replicates the monitoring configuration identified by the user from the source monitoring server and deploys the monitoring configuration at the destination monitoring server without any human intervention. In one embodiment, the monitoring manager exports the monitoring configuration from the source monitoring server to generate an export file of the monitoring configuration, transfers the export file to the destination monitoring server and deploys the monitoring configuration at the destination monitoring server based on the export file of the monitoring configuration. The monitoring manager further selects the appropriate set of monitoring definitions from the monitoring configuration for each computing node that is controlled by the destination monitoring server and reports monitored events to the destination monitoring server.

By replicating the monitoring configuration from the source monitoring server and deploying the monitoring configuration at one or more destination monitoring servers the system and methods described herein ensure that the monitoring configuration is deployed quickly and consistently across monitoring servers and infrastructures. This allows monitoring the availability and performance of computing nodes across an enterprise network in a predictable and consistent manner based on uniform monitoring rules. Additionally, a same monitoring configuration may be deployed simultaneously across a plurality of monitoring infrastructures with high degree of consistency, accuracy and speed.

In one embodiment, a system includes a source monitoring server, a destination monitoring server and a central monitoring device operatively coupled to the source and destination monitoring servers. The source monitoring server is configured to monitor at least one parameter for a first set of computing devices and the destination monitoring server is configured to monitor the at least one parameter for a second set of computing devices. The central monitoring device includes a processor which is configured to obtain user input to deploy in the destination monitoring server a monitoring configuration stored at the source monitoring server, wherein the user input includes an indication of the source monitoring server, an indication of the destination monitoring server and an identity of the monitoring configuration. The processor is configured to access the source monitoring server using a first service account that does not require human intervention and export the monitoring configuration from the source monitoring server to generate an export file of the monitoring configuration. The processor is configured to then access the destination monitoring server using a second service account that does not require human intervention and transfer the export file of the monitoring configuration to the destination monitoring server. The processor is configured to deploy the monitoring configuration at the destination monitoring server based on the export file to cause the destination monitoring server to monitor the at least one parameter of one or more computing devices from the second set of computing devices according to the monitoring configuration.

The above described system allows quick replication of an existing monitoring configuration from one monitoring infrastructure and deployment at one or more other monitoring infrastructures with a high degree of accuracy. The system and methods as described herein further configure a monitoring agent based on a set of monitoring rules from the monitoring configuration that is customized for the monitoring agent. Also, the disclosed system and methods may select the appropriate threshold values for monitoring respective parameters of a system based on historical data related to monitoring the parameters for the system. This allows the monitoring of certain systems and applications to suit customized requirements. Additionally, the disclosed system and methods select an appropriate destination monitoring server for deployment of the monitoring configuration based on an indication of one or more host computing nodes provided by a user.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
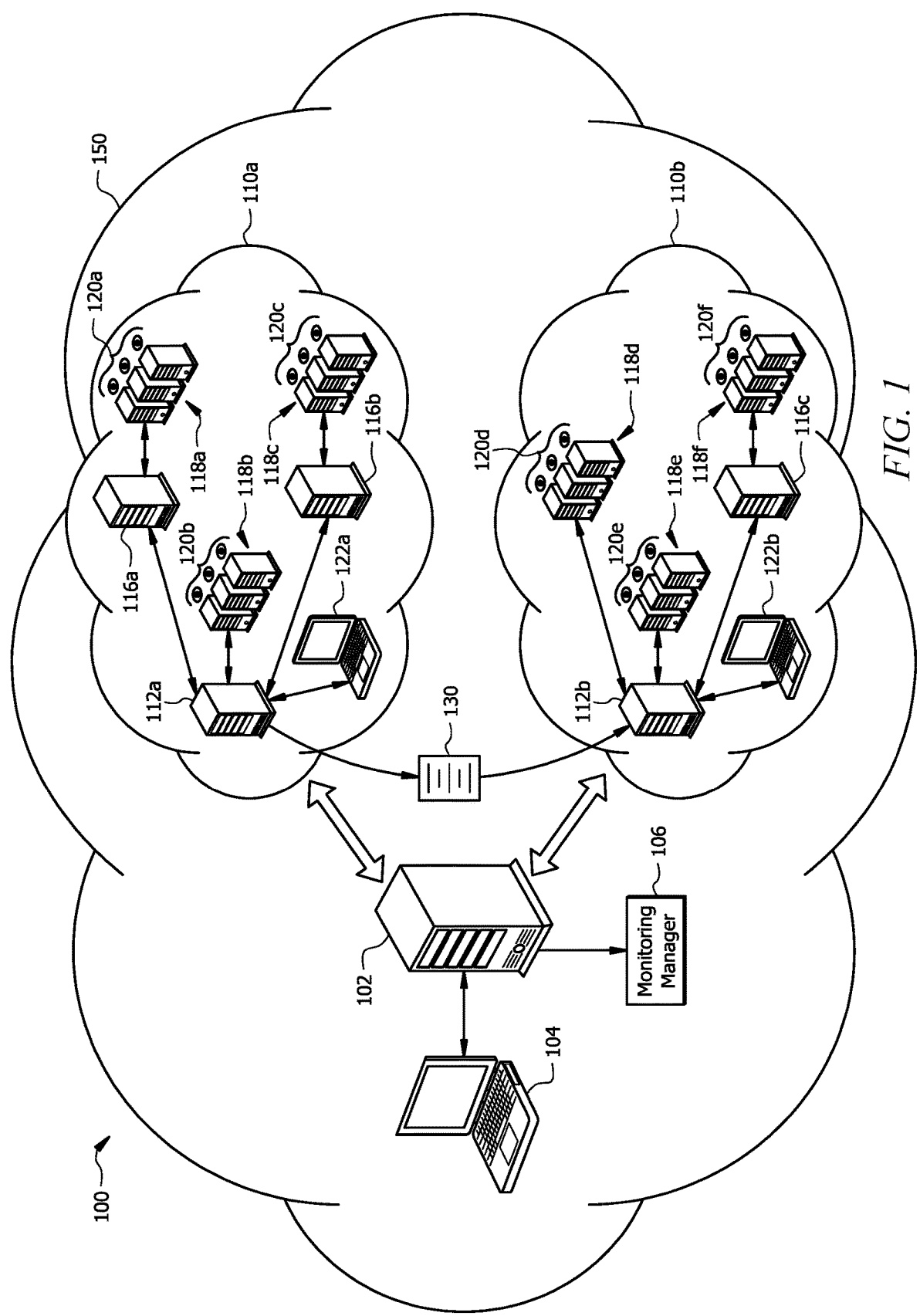
FIG. 1 is a schematic diagram of a monitoring system for monitoring performance and availability of systems and applications in an enterprise network, in accordance with certain embodiments of the present disclosure.

FIG. 1 is a schematic diagram of a monitoring system 100 for monitoring performance and availability of systems and applications in an enterprise network, in accordance with certain embodiments of the present disclosure.

Monitoring Infrastructures

As shown, the monitoring system 100 includes a plurality of monitoring infrastructures 110. A large enterprise typically maintains a distributed enterprise network including multiple clusters of computing nodes. For example, the enterprise network may be divided by regions (e.g., continent, country, province, state, city, etc.), wherein each region is associated with a regional cluster of computing nodes of the enterprise network. A monitoring system (e.g., monitoring system 100) designed to monitor performance and availability of systems and applications within the enterprise network may be divided into several monitoring infrastructures, wherein each monitoring infrastructure is responsible to monitor parameters related to a particular cluster of computing nodes of the enterprise network. FIG. 1 shows two such monitoring infrastructures 110a and 110b as part of the monitoring system 100. In an embodiment, each of the monitoring infrastructures 110a and 110b is configured to monitor parameters for a different regional cluster of computing nodes of an enterprise network. For example, as shown in FIG. 1, monitoring infrastructure 110a is configured to monitor parameters related to computing nodes 118a-c. Similarly, monitoring infrastructure 110b is configured to monitor parameters related to computing nodes 118d-f. The parameters that may be monitored by the monitoring system 100 may include CPU (central processing unit) metrics, disk space metrics, invalid login attempts and other parameters that indicate availability and/or performance of a system or application with an enterprise network.

While FIG. 1 shows two monitoring infrastructures, a skilled person may appreciate that the monitoring system 100 may include less than two or more than two monitoring infrastructures depending on a size and architecture of the enterprise network the monitoring system 100 is designed to monitor.

Each of the monitoring infrastructures 110 is based on a server-client-agent architecture following a hub-spoke model. Monitoring agents 120 are installed at computing nodes 118 of an enterprise network. A computing node 118 may also be referred to as a host computing node or simply a host node as it hosts the monitoring agent 120 that is configured to monitor the computing node 118. As shown in FIG. 1, monitoring agents 120a-f monitor computing nodes 118a-f respectively. In an embodiment, one or more monitoring agents 120 may be configured to monitor each computing node 118. For example, the monitoring agents 120 may include OS (Operating System) monitoring agent, log monitoring agent, script monitoring agent, SNMP (Simple Network Management Protocol agent) and the like. The monitoring agents 120 collect data from monitored computing nodes 118 and report the collected data to a monitoring server 112 or 116. In an embodiment, a monitoring agent 120 interacts with a single operating system or application and in most cases is located at the same computing node 118 where the operating system or application is running. A monitoring agent 120 may be an OS agent or a non-OS agent. OS agents may monitor the availability and performance of computing nodes 118 (e.g., Windows server), while non-OS agents may monitor the availability and performance of applications installed at the computing nodes 118.

A monitoring agent 120 monitors an operating system or application at a computing node 118 based on a monitoring configuration. A monitoring configuration is a set of definitions of conditions or events to test and may be used to raise alerts of the conditions and to trigger single action commands or automated workflows. A monitoring configuration may be configured to detect when specific conditions or events (e.g., slow transaction rates or invalid logon attempts) in an infrastructure occur, and in response, raise an alert. Each monitoring configuration may be assigned to one or more operating systems or applications that is to be monitored for specific events. An event monitored by a monitoring configuration may be pure or sampled. When the determination of an event is based on observations made at specific intervals, the event may be referred to as a sampled event. When an event is based on a spontaneous occurrence, the event may be referred to as a pure event. Thus, a definition for a sampled event generally includes an interval at which observations for the event are made. Definitions for pure events are not associated with intervals. An example of a sampled event is disk free space <10%. The sample event becomes true when the available disk space falls below 10% and later becomes false again after unwanted files are deleted and the disk space goes to 11% or higher. An example of a pure event is an event that monitors for an invalid user logon attempt. The event occurs when an invalid logon attempt is detected and is set to true. This event does not become a false once set to true. In order to monitor an operating system or application, a respective monitoring agent 120 may use a pre-defined monitoring configuration or a custom monitoring configuration specifically created for the operating system or application being monitored.

As shown in FIG. 1, each monitoring infrastructure 110 includes a plurality of monitoring servers 112 and 116 which act as a collection and control points for performance and availability data and alerts received from monitoring agents 120. For example, in monitoring infrastructure 110a, monitoring agents 120a (monitoring computing nodes 118a) report performance and availability data to monitoring server 116a, monitoring agents 120b (monitoring computing nodes 118b) report data to monitoring server 112a and monitoring agents 120c (monitoring computing nodes 118c) report data to monitoring server 116b. Similarly, in monitoring infrastructure 110b, monitoring agents 120d (monitoring computing nodes 118d) and monitoring agents 120e (monitoring computing nodes 118e) report performance and availability data to monitoring server 112b, and monitoring agents 120f (monitoring computing nodes 118f) report data to monitoring server 116c.

Each monitoring server 112 or 116 is also responsible for tracking the online or offline status of monitoring agents 120 reporting data to the monitoring server 112 or 116. Because of the number of functions a monitoring server 112 or 116 performs, large-scale enterprise networks usually include multiple monitoring servers to distribute the load, as shown in FIG. 1. In an embodiment, one of the monitoring servers in each monitoring infrastructure 110 is designated as the hub monitoring server, and the remaining servers are termed remote monitoring servers which report their data to the hub monitoring server. For example, in monitoring infrastructure 110a, monitoring server 112a is a hub monitoring server and monitoring servers 116a and 116b are remote monitoring servers. Similarly, in monitoring infrastructure 110b, monitoring server 112b is a hub monitoring server and monitoring server 116c is a remote monitoring server.

Each monitoring server 112 or 116 is located on its own computer and has a unique monitoring server name. The architectures of various remote monitoring servers 116 may differ from each other and from the hub monitoring server 112. For example, a remote monitoring server 116 running on UNIX may report to a hub monitoring server running on Windows.

A user may access data from a monitoring server 112 or 116 using a portal client 122. As shown, monitoring infrastructure 110a includes a portal client 122a connected to the hub monitoring server 112a. Similarly, monitoring infrastructure 110b includes a portal client 122b connected to the hub monitoring server 112b. An optional portal server (not shown) may provide presentation and communication services for each portal client 122. The portal server may provide the core presentation layer for retrieval, manipulation, analysis, and pre-formatting of data. The portal server may retrieve data from the hub monitoring server 112 in response to user actions at the portal client 122 and send the data back to the portal client 122 for presentation. The portal server may also provide presentation information to the portal client 122 so that the portal client 122 can render the user interface views suitably. In an embodiment, the services of portal server may be integrated into the hub monitoring server 112, and the hub monitoring server 112 may be configured to provide presentation and communication services for each portal client 122.

While FIG. 1 shows the portal clients 122 connected to the hub monitoring servers 112, a skilled person may appreciate that one or more of the remote monitoring servers 116 may have their own respective portal clients which may be used to access data from the one or more remote monitoring servers 116.

Central Monitoring Server and Central Client Device

As shown in FIG. 1, the monitoring system 100 also includes a central monitoring server 102 which is configured to manage a plurality of monitoring infrastructures such as monitoring infrastructures 110a and 110b. A central client device 104 may provide a front-end user interface which may be used by a user to provide input parameters and trigger one or more jobs related to the monitoring infrastructures 110. Additionally, data retrieved from the monitoring infrastructures may be presented to the user using the front-end interface of the central client device 104. In an embodiment, the front-end interface may be a web application implemented using any conventional technology such as Java Server Pages (JSP). In an embodiment, the central monitoring server 102 may be any conventional webserver that can handle HTTP (Hypertext Transfer Protocol) request and response such as an Apache Tomcat Webserver. Further, the central monitoring server 102 may be a Linux or Windows based server.

In an embodiment, the front-end interface may be representative of a component of a client-server application (or other distributed application) which can communicate with the server 102 over the network 150. For example, the front-end interface may be a "thin" client where the processing is largely directed by the front-end application but performed by the server 102.

The central monitoring server 102 may include a monitoring manager 106 configured to manage the monitoring infrastructures 110. In certain embodiments, the monitoring manager 106 may be configured to replicate a monitoring configuration that is deployed at one monitoring infrastructure and deploy the monitoring configuration at another monitoring infrastructure. For example, the monitoring manager 106 may replicate a monitoring configuration 130 that is deployed at hub monitoring server 112a of monitoring infrastructure 110a and deploy the same monitoring configuration 130 at the hub monitoring server 112b of the monitoring infrastructure 110b. While the following description describes replication of the monitoring configuration 130 from the hub monitoring server 112a and deployment at hub monitoring server 112b, the methods discussed herein may equally apply to replication of a monitoring configuration 130 from any monitoring server 112/116 or host computing node 118 to any other monitoring server 112/116 or host computing node 118.

The user may initiate replication and deployment of a monitoring configuration using the front-end interface of the central client device 104 by providing an indication of a source monitoring server from which the monitoring configuration is to be replicated, an indication of the monitoring configuration that is to be replicated, and an indication of a destination monitoring server where the monitoring configuration is to be deployed. For example, using a user interface screen of the front-end application running on the central client device 104, the user may provide an identity (e.g., unique server name or number) of the hub monitoring server 112a as the source monitoring server, an identity of the monitoring configuration 130 (e.g., monitoring configuration name) and an identity of the hub monitoring server 112b as the destination monitoring server. In an embodiment, the user may either type in the identities in respective text fields or may select one or more of the identities from respective lists. For example, the user may select the source and destination monitoring servers from a list of monitoring servers. Also, the user may select the monitoring configuration 130 from a list of monitoring configurations available at the hub monitoring server 112a. After providing information relating to the source monitoring server 112a, the monitoring configuration 130 and the destination monitoring server 112b, the user may trigger the replication and deployment (referred to as a job) of the selected monitoring configuration from the central client device 104, for example, by selecting a button on a user interface screen of the front-end application. In an embodiment, the front-end application at the central client device 104 or the monitoring manager 106 may check for errors in the user provided input. For example, the user inputs may be checked for typographical errors, format errors (e.g. format of the server identities or monitoring configuration name) and the like, and the user may be notified of any identified errors in the user inputs or the errors may be corrected automatically.

Once the replication and deployment is triggered at the central client device 104, the monitoring manager 106 generates a unique trace log file to record information relating to the execution of the job. For example, the monitoring manager 106 may record a user ID of the user that triggered the job, a unique job ID of the job, a time of triggering the job by the user, and the user inputs relating to the source monitoring server 112a, the monitoring configuration 130 and the destination monitoring server 112b. The monitoring manager 106 records in the trace log file every transaction during the replication and deployment of the monitoring configuration 130 starting from obtaining user input at the central client device 104 to deploying the monitoring configuration 130 at the destination monitoring server 112b.

The monitoring manager 106 may check the feasibility of the job requested by the user. For example, the monitoring manager 106 may check whether the monitoring configuration is compatible with the destination monitoring server 112b and other components of the monitoring infrastructure 110b. For example, the monitoring configuration 130 may not include monitoring definitions that are compatible with one or more monitoring agents 120 in the monitoring infrastructure 110b. In such a case, the monitoring manager 106 may determine that the job is not feasible and notify the user. In response, the user may select another monitoring configuration deployed at the source hub monitoring server 112a for replication and deployment at the destination hub monitoring server 112b.

The monitoring manager 106 validates an access level of the user that triggered the job and checks whether the user is authorized to trigger the job based the user's level of access. Three different levels of access may be defined to provide proper authorization to users. Users with an engineering level access may execute jobs at development infrastructures only. Users with operations level access may execute jobs at development as well as production infrastructures. Users with no access may not execute any jobs. The monitoring manager 106 allows the job to be executed only if the user triggering the job has the appropriate level of access to execute the job on the monitoring infrastructures 110a and 110b.

The monitoring manager 106 also checks whether one or more existing monitoring configurations deployed at the destination monitoring server 112b can be replaced by the monitoring infrastructure 130. For example, the monitoring manager 106 does not allow monitoring configurations already deployed at the destination monitoring server 112b to be replaced with incorrect versions or older versions of the monitoring configuration 130.

Once all error checks and validations are completed, the monitoring manager 106 accesses the source monitoring server 112a using a service account that does not require human intervention and has the appropriate level of access to execute the job. Accessing the source monitoring server 112a may include automatically logging into the source monitoring server 112a using the service account. Once the monitoring manager 106 successfully accesses the source monitoring server 112a and establishes a connection with the source monitoring server 112a, the monitoring manager 106 exports a copy of the monitoring configuration 130 from the source monitoring server 112a and generates an export file.

Once the export file for the monitoring configuration 130 is successfully generated, the monitoring manager 106 accesses the destination monitoring server 112b using the service account with an appropriate level of access to perform the job at the destination monitoring server 112b. Accessing the destination monitoring server 112b may include automatically logging into the destination monitoring server 112b using the service account. In an embodiment, the monitoring manager 106 may use different service accounts for accessing the source monitoring server 112a and the destination monitoring server 112b. For example, the monitoring manager 106 may use a first service account to access the source monitoring server 112a and use a second different service account to access the destination monitoring server 112b. Once the monitoring manager 106 successfully accesses the destination monitoring server 112b and establishes a connection with the destination monitoring server 112b, the monitoring manager 106 transfers the export file of the monitoring configuration 130 from the source monitoring server 112a to the destination monitoring server 112b. In one embodiment, the monitoring manager 106 first transfers the export file from the source monitoring server 112a to the central monitoring server 102, and then transfers the export file from the central monitoring server 102 to the destination monitoring server 112b after successfully accessing the destination monitoring server 112b. Once the monitoring manager 106 successfully establishes a connection with the destination monitoring server 112b and transfers the export file of the monitoring configuration 130 to the destination monitoring server 112b, the monitoring manager 106 deploys the monitoring configuration 130 at the destination monitoring server 112b.

In an embodiment, deploying the monitoring configuration 130 at the destination monitoring server 112b may include deploying the monitoring configuration 130 at each of the remote monitoring servers (e.g., 116c) of the monitoring infrastructure 110b and automatically configuring the monitoring agents 120d-f based on the definitions in the monitoring configuration 130. Once the monitoring agents 120d-f are configured based on the monitoring configuration 130, the monitoring agents 120d-f may start monitoring parameters related to the availability and performance of systems and applications based on the monitoring configuration 130.

In certain embodiments, before deploying the monitoring configuration 130 at the destination monitoring server 112b, the monitoring manager 106 checks whether a monitoring configuration is already deployed at the destination monitoring server 112b. This monitoring configuration may be an older version of the monitoring configuration 130 or a different monitoring configuration. If the monitoring manager 106 identifies a monitoring configuration already deployed at the destination monitoring server 112b, the monitoring manager 106 takes a backup of the existing monitoring configuration from the destination monitoring server 112b. For example, the monitoring manager 106 may export a copy of the existing monitoring configuration and generate a backup export file for the existing monitoring configuration. In an embodiment, the monitoring manager 106 extracts a list of one or more host computing nodes 118 within the monitoring infrastructure 110b which are monitored based on the existing monitoring configuration. The monitoring manager may generate another backup file with information relating to the extracted list of host computing nodes. Once the backup files are successfully generated the monitoring manager deletes or uninstalls the existing monitoring configuration from the destination monitoring server 112a and deploys the new monitoring configuration 130. After deploying the monitoring configuration 130 at the destination monitoring server 112b, the monitoring manager 106 assigns the list of one or more host computing nodes 118 to the newly deployed monitoring configuration 130 based on the backup file to cause the respective monitoring agents 120 of the one or more host computing nodes 118 to be configured based on the newly deployed monitoring configuration 130.

If the deployment of the monitoring configuration 130 is unsuccessful for some reason, the monitoring manager 106 may restore the older monitoring configuration at the destination monitoring server 112b based on the backup export file of the older monitoring configuration.

The monitoring manager 106 may collect information relating to the replication and deployment of the monitoring configuration 130 and present the collected information to the user using the front-end user interface at the central client device 104. For example, the user may monitor the progress of the replication and deployment in real-time at the central client device 104. The monitoring manager 106 may collect information relating to each step of the replication and deployment while the step is being executed and present the collected information in real-time at the central client device 104. For example, the monitoring manager 106 may collect and present information including to accessing the source monitoring server 112a, establishing a connection with the source monitoring server 112a, exporting the monitoring configuration 130 at the source monitoring server 112a and generating the export file, accessing the destination monitoring server 112b, establishing a connection with the destination monitoring server 112b, taking backup of an existing monitoring configuration and deploying the monitoring configuration 130 at the destination monitoring server 112b.

In certain embodiments, the monitoring configuration 130 may include a configuration template which includes a plurality of sets of monitoring definitions, wherein each set of monitoring definitions is customized for monitoring a particular type of computing node or application. For example, a monitored computing node 118 may be a Linux server, a Windows Server, a database server, an application server and a web server. Further, a computing node may be have an assigned priority level such as a critical server, development server, production server and the like. In an embodiment, for each computing node 118 in the monitoring infrastructure 112b, the monitoring manager 106 may be configured to determine a type of the computing node 118 and configure one or more respective monitoring agents with the set of monitoring definitions from the monitoring configuration 130 suitable for the computing node 118.

The configuration template of the monitoring configuration 130 may include a plurality of sets of monitoring definitions, wherein each set of monitoring definitions is customized based on a business application or services implemented by a computing node 118. For example, a business application implemented by a monitored computing node 118 may include trading application, HR (Human Resources) application, banking application, web application and the like. In an embodiment, for each computing node 118 in the monitoring infrastructure 112b, the monitoring manager 106 may be configured to determine a type of application implemented by the computing node 118 and configure one or more respective monitoring agents with the set of monitoring definitions from the monitoring configuration 130 suitable for the application.

The configuration template of the monitoring configuration 130 may include a set of parameters and a set of threshold values for each parameter that may be monitored for a system or application. For each computing node 118 of the monitoring infrastructure 110b, the monitoring manager may be configured to check historical data relating to the behavior of the computing node 118 and may configure a respective monitoring agent 120 with the set of parameters and corresponding threshold values for each of the parameters that are most suitable for the computing node 118 based on the historical data. For example, the historical data related to a monitored computing node 118 may be recorded in a ticketing history tool which records detected events and alerts related to each parameter. The monitoring manger may select at least those parameters for monitoring which are frequently reported for the computing node 118. The historical data may also include information relating to the threshold values alerted for each monitored parameter. The monitoring manager may select appropriate threshold values from the template for each parameter to be monitored based on the historical data. For example, if a threshold value for a parameter is being reported too often, the monitoring manager 106 may set a higher threshold value for the parameter to reduce a number of alerts for the parameter.

In an embodiment, when triggering the replication and deployment of the monitoring configuration 130 at the destination monitoring server 112b, the user may provide an identity of one or more host computing nodes 118 of the monitoring infrastructure 110b the user wishes to configure for monitoring. The monitoring manager 106 may be configured to determine an identity of the hub monitoring server 112b based on the identities of the host computing nodes 118, and may assign the identified hub monitoring server 112b as the destination monitoring server for the replication and deployment of the monitoring configuration 130.

As shown in FIG. 1 all components of the monitoring system 100 may be connected to a network 150 and may communicate with each other over the network 150. The network 150, in general, may be a wide area network (WAN), personal area network (PAN), a cellular network, or any other technology that allows devices to communicate electronically with other devices. In one or more embodiments, the network 150 may be the internet.

Each of the computing nodes 118 may include a computing device running one or more software applications. For example, a computing node 118 may be representative of a computing system hosting software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices.

Figure 2:
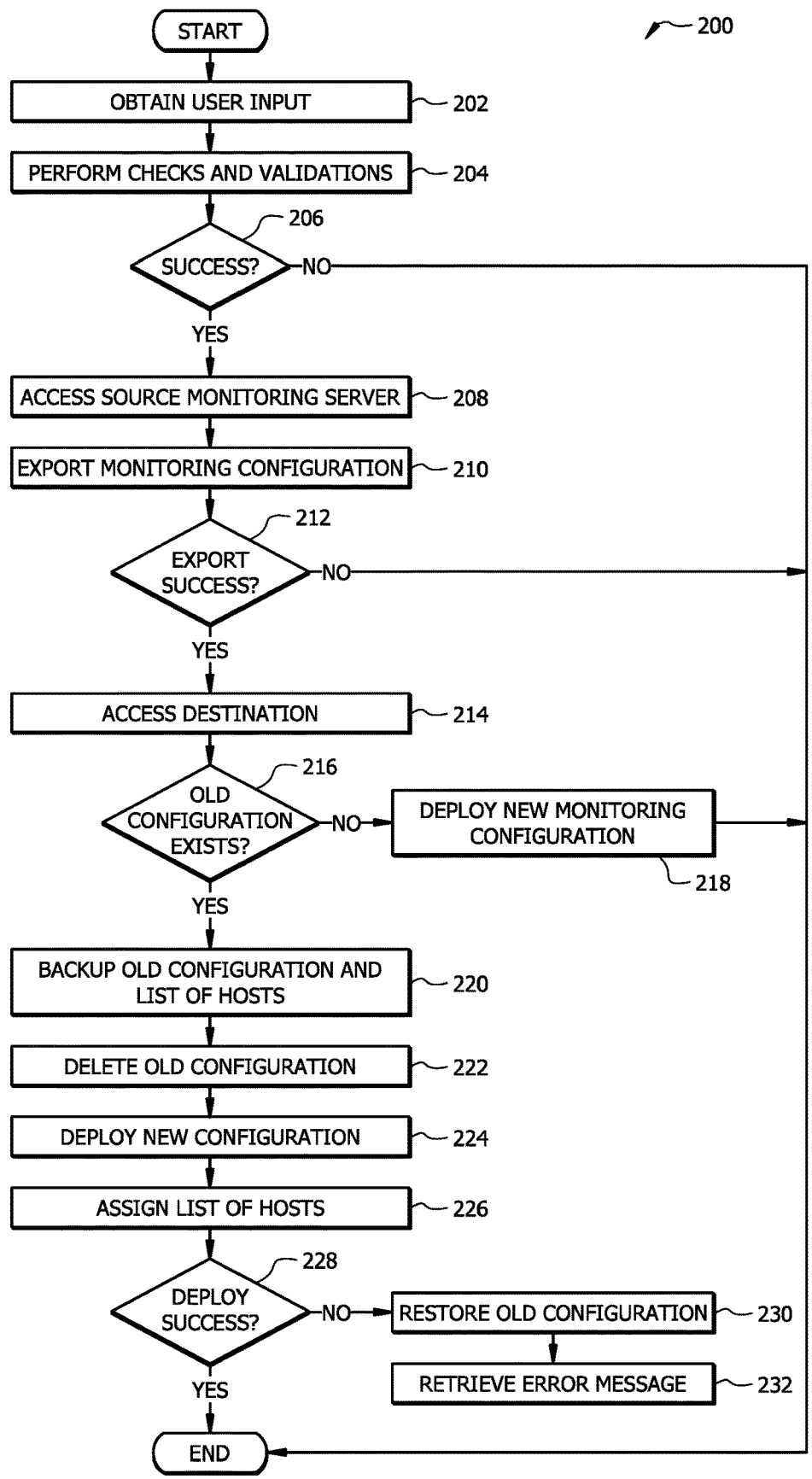
FIG. 2 illustrates a flowchart of an example method for replicating and deploying a monitoring configuration, in accordance with certain embodiments of the present disclosure.

FIG. 2 illustrates a flowchart of an example method 200 for replicating and deploying a monitoring configuration, in accordance with certain embodiments of the present disclosure. In an embodiment the method 200 may be performed by the monitoring manager 106 of a central monitoring device (e.g., center monitoring server 102) shown in FIG. 1.

At step 202, the monitoring manager 106 may obtain user input to deploy in the destination monitoring server 112b a monitoring configuration (e.g., monitoring configuration 130) stored at the source monitoring server 112a. A user may initiate the replication and deployment of the monitoring configuration 130 using a front-end interface of the central client device 104 by providing an indication of the source monitoring server 112a from which the monitoring configuration is to be replicated, an indication of the monitoring configuration 130 that is to be replicated, and an indication of the destination monitoring server 112b where the monitoring configuration 130 is to be deployed. For example, using a user interface screen of the front-end application running on the central client device 104, the user may provide an identity (e.g., unique server name or number) of the hub monitoring server 112a as the source monitoring server, an identity of the monitoring configuration 130 (e.g., monitoring configuration name) and an identity of the hub monitoring server 112b as the destination monitoring server. In an embodiment, the user may either type in the identities in a text field or may select one or more of the identities from respective lists. For example, the user may select the source and destination monitoring servers from a list of monitoring servers. Also, the user may select the monitoring configuration 130 from a list of monitoring configurations available at the source monitoring server 112a.

In an embodiment, the indication of the source monitoring server 112a provided by the user as user input may include an identity of one or more host computing nodes 118 of the monitoring infrastructure 110b the user wishes to configure for monitoring. The monitoring manager 106 may determine an identity of the hub monitoring server 112b based on the identities of the host computing nodes 118 and may assign the identified hub monitoring server 112b as the destination monitoring server for the replication and deployment of the monitoring configuration 130.

In an embodiment, the front-end interface may be a web application implemented using any conventional technology such as Java Server Pages (JSP). In an embodiment, the central monitoring server 102 may be any conventional webserver that can handle HTTP (Hypertext Transfer Protocol) request and response such as an Apache Tomcat Webserver. Further, the central monitoring server 102 may be a Linux or Windows based server.

In an embodiment, the front-end application at the central client device 104 optionally checks for errors in the user provided input. For example, the JSP front-end at the central client device 104 checks the user inputs for typographical errors, format errors (e.g. format of the server identities or monitoring configuration name) and the like and notifies the user of any identified errors in the user inputs.

After providing user input relating to the source monitoring server 112a, the monitoring configuration 130 and the destination monitoring server 112b, the user may trigger the replication and deployment (referred to as a job) of the monitoring configuration 130 from the central client device 104, for example, by selecting a button on a user interface screen of the front-end application.

At step 204, the monitoring manager 106 performs one or more checks and validations based on the obtained user input. For example, the monitoring manager 106 validates an authorization of the user to perform the replication and deployment of the monitoring configuration 130.

In an embodiment, the monitoring manager 106 validates an access level of the user that triggered the job and checks whether the user is authorized to trigger the job based the user's level of access. Three different levels of access may be defined to provide proper authorization to users. Users with an engineering level access may execute jobs at development infrastructures only. Users with operations level access may execute jobs at development as well as production infrastructures. Users with no access may not execute any jobs. The monitoring manager 106 allows the job to be executed only if the user triggering the job has the appropriate level of access to execute the job on the monitoring infrastructures 110a and 110b.

In an embodiment, the monitoring manager 106 checks the feasibility of the job requested by the user. For example, the monitoring manager 106 may check whether the monitoring configuration 130 is compatible with the destination monitoring server 112b and other components of the monitoring infrastructure 110b. For example, the monitoring configuration 130 may not include monitoring definitions that are compatible with one or more monitoring agents 120 in the monitoring infrastructure 110b. In such a case, the monitoring manager 106 may determine that the job is not feasible and notify the user via the front-end interface of the central client device 104. In response, the user may select another monitoring configuration deployed at the source monitoring server 112a for replication and deployment at the destination monitoring server 112b.

In an embodiment, the monitoring manager 106 also checks whether one or more existing monitoring configurations deployed at the destination monitoring server 112b are allowed to be replaced by the monitoring infrastructure 130. For example, the monitoring manager 106 does not allow monitoring configurations already deployed at the destination monitoring server 112b to be replaced with incorrect versions or older versions of the monitoring configuration 130.

In an example, once the replication and deployment of the monitoring configuration 130 is triggered at the central client device 104, the JSP front-end passes the user input parameters to a Java servlet at the central monitoring server 102. The Java servlet may be managed and run by the monitoring manager 106 at the central monitoring server 102. The servlet performs the various checks and validations described above based on the user input parameters obtained from the JSP front-end.

In an optional embodiment, once the replication and deployment of the monitoring configuration is triggered at the central client device 104, the monitoring manager 106 generates a unique trace log file to record information relating to the execution of the job. For example, the monitoring manager 106 may record a user ID of the user that triggered the job, a unique job ID of the job, a time of triggering the job by the user, and the user inputs relating to the source monitoring server 112a, the monitoring configuration 130 and the destination monitoring server 112b. The monitoring manager 106 records in the trace log file every transaction (including results of each transaction such as success or errors) during the replication and deployment of the monitoring configuration 130 starting from obtaining user input at the central client device 104 to deploying the monitoring configuration 130 at the destination hub monitoring server 112b.

At step 206, the monitoring manager 106 determines whether the checks and validations performed at step 202 were successful. For example, the monitoring manager determines that the checks and validations are successful when the user is determined to have the appropriate authorization to execute the job and that the job is feasible. If the monitoring manger 106 determines that any one of the checks and validation is unsuccessful, the method 200 ends. On the other hand, if the monitoring manager determines that all checks and validations described above are successful, the method 200 proceeds to step 208.

At step 208, the monitoring manager 106 accesses the source monitoring server 112a. In an embodiment, once all checks and validations are completed, the monitoring manager 106 accesses the source monitoring server 112a using a service account that does not require human intervention and has the appropriate level of access to execute the job at the source monitoring server 112a. Accessing the source monitoring server 112a may include automatically logging into the source monitoring server 112a using the service account. Once the monitoring manager 106 successfully accesses the source monitoring server 112a, it establishes a connection with the source monitoring server 112a.

At step 210, once the monitoring manager 106 successfully accesses the source monitoring server 112a and establishes a connection with the source monitoring server 112a, the monitoring manager 106 exports a copy of the monitoring configuration 130 from the source monitoring server 112a and generates an export file of the monitoring configuration 130. In an embodiment the monitoring manager transfers the export file of the monitoring configuration 130 to the central monitoring server 102 for further processing of the job.

In an embodiment, the monitoring manager 106 may use an Application Process Interface (API) to communicate with the source monitoring server 112a. The monitoring manager may use the API to transmit commands to the source monitoring server 112a and to retrieve data (e.g., statuses of transactions, errors, other log data etc.) from the source monitoring server 112a. For example, the monitoring manager may use the API to transmit commands to the source monitoring server 112a for accessing the source monitoring server 112a, generating the export file of the monitoring configuration and sending the export file to the central monitoring server 102. At step 212, the monitoring manager 106 determines whether generation of the export file of the monitoring configuration 130 was successful. If the generation of the export file is unsuccessful, the method 200 ends here. On the other hand, if the generation of the export file is successful, the method 200 proceeds to step 214.

At step 214, the monitoring manager accesses the destination monitoring server 112b. In an embodiment, once the export file for the monitoring configuration 130 is successfully generated at the source monitoring server 112a, the monitoring manager 106 accesses the destination monitoring server 112b using a service account with an appropriate level of access to perform the job at the destination monitoring server 112b. Accessing the destination monitoring server 112b may include automatically logging into the destination monitoring server 112b using the service account. In an embodiment, the monitoring manager 106 may use the same service account or different service accounts for accessing the source monitoring server 112a and the destination monitoring server 112b. For example, the monitoring manager 106 may use a first service account to access the source monitoring server 112a and use a second different service account to access the destination monitoring server 112b. Once the monitoring manager 106 successfully accesses the destination monitoring server 112b, it establishes a connection with the destination monitoring server 112b.

At step 216, the monitoring manager 106 determines whether another monitoring configuration is already deployed at the destination monitoring server 112b. In an embodiment, before deploying the monitoring configuration 130 at the destination monitoring server 112b, the monitoring manager 106 checks whether another monitoring configuration is already deployed at the destination monitoring server 112b. This monitoring configuration may be an older version of the monitoring configuration 130 or a different monitoring configuration.

If the monitoring manager 106 determines at step 216 that another monitoring configuration is not already deployed at the destination server, the method 200 proceeds to step 218 where the monitoring manager 106 deploys the new monitoring configuration 130 based on the export file of the monitoring configuration 130 generated at the source monitoring server 112a. In an embodiment, once the monitoring manager 106 successfully accesses the destination monitoring server 112b and establishes a connection with the destination monitoring server 112b, the monitoring manager 106 transfers the export file of the monitoring configuration 130 (generated at the source monitoring server 112a) from the source monitoring server 112a to the destination monitoring server 112b. In one embodiment, when the central monitoring server has a copy of the export file (e.g., when the export file was previously transferred from the source monitoring server 112a to the central monitoring server 102), the monitoring manager 106 transfers the export file from the central monitoring server 102 to the destination monitoring server 112b. Once, the monitoring manager 106 successfully transfers the export file of the monitoring configuration 130 to the destination monitoring server 112b, the monitoring manager 106 deploys the monitoring configuration 130 at the destination monitoring server 112b based on the export file. Deploying the monitoring configuration 130 at the destination monitoring server 112b causes the destination monitoring server 112b to monitor one or more parameters of one or more computing devices (e.g., computing nodes 118) according to the monitoring configuration 130.

In an embodiment, deploying the monitoring configuration 130 at the destination monitoring server 112b includes deploying the monitoring configuration 130 at each of the remote monitoring servers (e.g., 116c) of the monitoring infrastructure 110b and automatically configuring the monitoring agents 120d-f based on the definitions in the monitoring configuration 130. Once the monitoring agents 120d-f are configured based on the monitoring configuration 130, the monitoring agents 120 may start monitoring parameters related to the availability and performance of systems and applications based on the monitoring configuration 130.

If the monitoring manager 106 determines at step 216 that another monitoring configuration is already deployed at the destination server, the method 200 proceeds to step 220 where the monitoring manager 106 captures a backup copy of the existing monitoring configuration from the destination monitoring server 112b. For example, the monitoring manager 106 may export a copy of an older version of the monitoring configuration and generate a backup export file for the older version. Additionally, the monitoring manager 106 extracts a list of one or more host computing nodes 118 within the monitoring infrastructure 110b which are monitored based on the existing monitoring configuration. The monitoring manager 106 may generate another backup file with information relating to the extracted list of host computing nodes 118.

At step 222, once the backup files of the existing monitoring configuration and the list of host computing nodes 118 are successfully generated, the monitoring manager 106 deletes or uninstalls the existing monitoring configuration from the destination monitoring server 112a.

At step 224, the monitoring manager 106 deploys the new monitoring configuration 130 based on the export file of the monitoring configuration 130 generated at the source monitoring server 112a. Deployment of the new monitoring configuration 130 is described above with reference to step 218.

At step 226, after deploying the monitoring configuration 130 at the destination monitoring server 112b, the monitoring manager 106 assigns the list of one or more host computing nodes 118 to the newly deployed monitoring configuration 130 based on the backup file generated at step 220. Once deployed, monitoring agents 120 of the one or more host computing nodes 118 from the assigned list of computing nodes 118 may be configured based on the newly deployed monitoring configuration 130.

At step 228, the monitoring manager 106 determines whether the deployment of the monitoring configuration 130 at the destination monitoring server 112b was successful. If the monitoring manager 106 determines that the deployment was successful, the method 200 ends here. On the other hand, if the monitoring manager 106 determines that the deployment was unsuccessful the method proceeds to step 230 where the monitoring manager 106 restores the older monitoring configuration at the destination monitoring server 112b based on the backup export file of the older monitoring configuration generated at step 220.

At step 232, the monitoring manager 106 retrieves an error message from the destination monitoring server 112b indicating that the deployment was not successful. In response, the monitoring manager 106 presents the error message to the user via the front-end on the central client device 102.

In an embodiment, the monitoring manager 106 may use an Application Process Interface (API) to communicate with the destination monitoring server 112b. This API may be same API used by the monitor manager 106 to communicate with the source monitoring server 112a. The monitoring manager may use the API to transmit commands to the destination monitoring server 112b and to retrieve data (e.g., statuses of transactions, errors, other log data etc.) from the destination monitoring server 112b. For example, the monitoring manager 106 may use the API to transmit commands to the destination monitoring server 112b to execute steps 214-232 of method 200.

In an example, once the Java servlet performs the various checks and validations at step 204, the servlet calls a script program, also managed by the monitoring manager 106, that executes a set of commands to perform steps 206-232 of the method 200. In an embodiment, data related to the execution of each step 204-232 including status updates and error messages may be passed back to the servlet and then to the JSP front-end for presentation to the user on the central client device 104.

Figure 3:
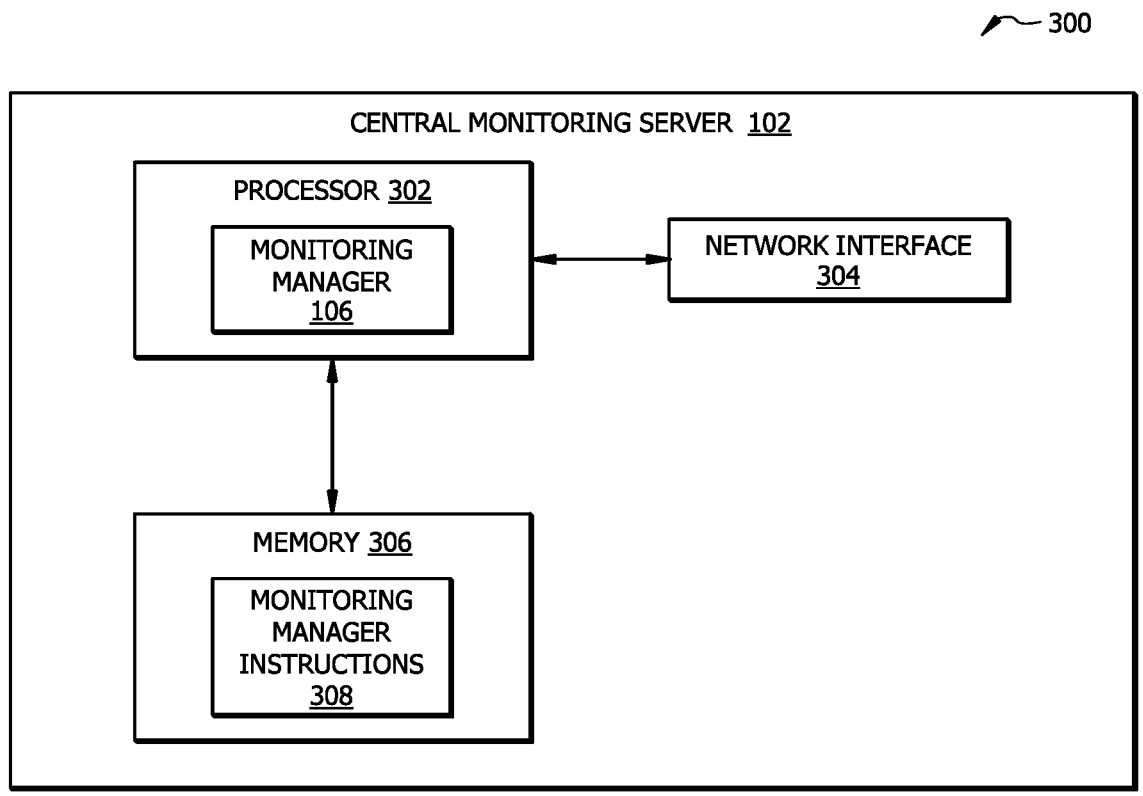
FIG. 3 illustrates an example schematic diagram of a central monitoring server, in accordance with one or more embodiments of the present disclosure.

FIG. 3 illustrates an example schematic diagram of the central monitoring server 102, in accordance with one or more embodiments of the present disclosure.

The central monitoring server 102 comprises a processor 302, a memory 306, and a network interface 304. The central monitoring server 102 may be configured as shown in FIG. 3 or in any other suitable configuration.

The processor 302 comprises one or more processors operably coupled to the memory 306. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 302 is communicatively coupled to and in signal communication with the memory 306. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (monitoring manager instructions 308) to implement the monitoring manager 106. In this way, processor 302 may be a special-purpose computer designed to implement the functions disclosed herein. In one or more embodiments, the monitoring manager 106 is implemented using logic units, FPGAs, ASICs, DSPs, or any other suitable hardware. The monitoring manager 106 is configured to operate as described with reference to FIGS. 1-2. For example, the monitoring manger 106 may be configured to perform at least a portion of the flowchart 200 as described in FIG. 2, respectively.

The memory 306 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 306 is operable to store the memory manager instructions 308 and/or any other data or instructions. The memory manager instructions 308 may include any suitable set of instructions, logic, rules, or code operable to execute the memory manager 106.

The network interface 304 is configured to enable wired and/or wireless communications. The network interface 304 is configured to communicate data between the central monitoring server 102 and other devices (e.g. source monitoring server 112a and destination monitoring server 112b), systems, or domains. For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that one or more other components shown in FIG. 1 may be implemented by a hardware device having a similar structure to the central monitoring device 102 shown in FIG. 3. For example, each of the monitoring servers 112 and 116, monitoring agents 120, computing nodes 118 and central client device 104 may have a similar structure shown in FIG. 3. For example, each of these devices may include a network interface to communicate with other devices within the network 150 and a processor operatively coupled to a memory storing instructions which when executed by the processor implement a functionality of the device as described with reference to FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
    a source monitoring server configured to monitor at least one parameter for a first set of computing devices;
    a destination monitoring server configured to monitor the at least one parameter for a second set of computing devices; and
    a central monitoring device operatively coupled to the source monitoring server and the destination monitoring server, wherein the central monitoring device comprises a processor configured to:
        obtain user input to deploy in the destination monitoring server a monitoring configuration stored at the source monitoring server, wherein the user input includes an indication of the source monitoring server, an indication of the destination monitoring server and an identity of the monitoring configuration;
        access the source monitoring server using a first service account that does not require human intervention;
        export the monitoring configuration from the source monitoring server to generate an export file of the monitoring configuration;
        access the destination monitoring server using a second service account that does not require human intervention;
        transfer the export file of the monitoring configuration to the destination monitoring server; and
        deploy the monitoring configuration at the destination monitoring server based on the export file to cause the destination monitoring server to monitor the at least one parameter of one or more computing devices from the second set of computing devices according to the monitoring configuration.

2. The system of claim 1, wherein the processor is further configured to generate at least one trace log to record information relating to a plurality of transactions performed starting from obtaining the user input to deploying the monitoring configuration at the destination monitoring server.

3. The system of claim 1, wherein the processor is configured to validate an authorization to perform the deploying of a user providing the user input.

4. The system of claim 1, wherein:
    the indication of the source monitoring server includes an identity of at least one computing device from the second set of computing devices; and
    the processor is configured to determine an identity of the destination monitoring server based on the identity of the at least one computing device.

5. The system of claim 1, wherein the processor is further configured to:
    detect that an older version of the monitoring configuration is deployed at the destination monitoring server;
    extract a list of the one or more computing devices from the destination monitoring server, wherein one or more computing devices in the list are configured to be monitored based on the older version of the monitoring configuration;
    capture a back-up copy of the older version of the monitoring configuration; and
    assign the list of the one or more computing devices to the monitoring configuration at the destination monitoring server, to cause the destination monitoring server to monitor the at least one parameter of the one or more computing devices in the list based on the monitoring configuration.

6. The system of claim 5, wherein the processor is further configured to:
    detect that the monitoring configuration has not successfully deployed at the destination monitoring server; and
    in response, restore the older version of the monitoring configuration at the destination monitoring server based on the back-up copy.

7. The system of claim 1, wherein the processor is further configured to:
    collect results of monitoring the one or more computing devices according to the monitoring configuration from the destination monitoring server; and
    render the results for display on a display device associated with the central monitoring device.

8. The system of claim 1, wherein the indication of the source monitoring server comprises an identity of the source monitoring server and an indication of the destination monitoring server comprises an identity of the destination monitoring server.

9. The system of claim 1, wherein the at least one parameter is associated with availability or performance of a computing device from the first set of computing devices or the second set of computing devices.

10. The system of claim 1, wherein the processor is configured to run an execution routine that receives the user input and performs the accessing the source monitoring server, exporting the monitoring configuration at the source monitoring server, accessing the destination monitoring server, transferring the export file to the destination monitoring server and deploying the monitoring configuration at the destination monitoring server.

11. A method for deploying a monitoring configuration, comprising:
    obtaining user input to deploy in a destination monitoring server the monitoring configuration stored at a source monitoring server, wherein:
        the source monitoring server is configured to monitor at least one parameter for a first set of computing devices;
        the destination monitoring server is configured to monitor the at least one parameter for a second set of computing devices; and
        the user input includes an indication of the source monitoring server, an indication of the destination monitoring server and an identity of the monitoring configuration;
    accessing the source monitoring server using a first service account that does not require human intervention;
    exporting the monitoring configuration from the source monitoring server to generate an export file of the monitoring configuration;
    accessing the destination monitoring server using a second service account that does not require human intervention;
    transferring the export file of the monitoring configuration to the destination monitoring server; and deploying the monitoring configuration at the destination monitoring server based on the export file to cause the destination monitoring server to monitor the at least one parameter of one or more computing devices from the second set of computing devices according to the monitoring configuration.

12. The method of claim 11, further comprising validating an authorization to perform the deploying of a user providing the user input.

13. The method of claim 11, wherein:
the indication of the source monitoring server includes an identity of at least one computing device from the second set of computing devices; and
the method further comprises determining an identity of the destination monitoring server based on the identity of the at least one computing device.

14. The method of claim 11, further comprising:
detecting that an older version of the monitoring configuration is deployed at the destination monitoring server;
extracting a list of the one or more computing devices from the destination monitoring server, wherein one or more computing devices in the list are configured to be monitored based on the older version of the monitoring configuration;
capturing a back-up copy of the older version of the monitoring configuration; and
assigning the list of the one or more computing devices to the monitoring configuration at the destination monitoring server, to cause the destination monitoring server to monitor the at least one parameter of the one or more computing devices in the list based on the monitoring configuration.

15. The method of claim 14, further comprising:
detecting that the monitoring configuration has not successfully deployed at the destination monitoring server; and
in response, restoring the older version of the monitoring configuration at the destination monitoring server based on the back-up copy.

16. The method of claim 11, further comprising:
collect results of monitoring the one or more computing devices according to the monitoring configuration from the destination monitoring server; and
render the results for display on a display device associated with the central monitoring device.

17. The method of claim 11, wherein the at least one parameter is associated with availability or performance of a computing device from the first set of computing devices or the second set of computing devices.

18. The method of claim 11, wherein an execution routine at the central monitoring server receives the user input and performs the accessing the source monitoring server, exporting the monitoring configuration at the source monitoring server, accessing the destination monitoring server, transferring the export file to the destination monitoring server and deploying the monitoring configuration at the destination monitoring server.

19. A non-transitory computer-readable medium for storing instructions which when executed by a processor causes the processor to perform a method for deploying a monitoring configuration, the method comprising:
obtaining user input to deploy in a destination monitoring server the monitoring configuration stored at a source monitoring server, wherein:
the source monitoring server is configured to monitor at least one parameter for a first set of computing devices;
the destination monitoring server is configured to monitor the at least one parameter for a second set of computing devices; and
the user input includes an indication of the source monitoring server, an indication of the destination monitoring server and an identity of the monitoring configuration;
accessing the source monitoring server using a first service account that does not require human intervention;
exporting the monitoring configuration from the source monitoring server to generate an export file of the monitoring configuration;
accessing the destination monitoring server using a second service account that does not require human intervention;
transferring the export file of the monitoring configuration to the destination monitoring server; and
deploying the monitoring configuration at the destination monitoring server based on the export file to cause the destination monitoring server to monitor the at least one parameter of one or more computing devices from the second set of computing devices according to the monitoring configuration.

20. The non-transitory computer-readable medium of claim 19, wherein an execution routine at the central monitoring server receives the user input and performs the accessing the source monitoring server, exporting the monitoring configuration at the source monitoring server, accessing the destination monitoring server, transferring the export file to the destination monitoring server and deploying the monitoring configuration at the destination monitoring server.

* * * * *